US011322997B2

(12) United States Patent
Zhou et al.

(10) Patent No.: US 11,322,997 B2
(45) Date of Patent: May 3, 2022

(54) ROTOR FOR A SYNCHRONOUS DRIVE MOTOR

(71) Applicant: BRUSA Elektronik AG, Sennwald (CH)

(72) Inventors: Tian Zhou, Lucerne (CH); Daniel Oeschger, St. Gallen (CH); Raphael Teufel, Empfingen (DE); Adina Muntean, Gams (CH)

(73) Assignee: BRUSA Elektronik AG, Sennwald (CH)

( * ) Notice: Subject to any disclaimer, the term of this patent is extended or adjusted under 35 U.S.C. 154(b) by 121 days.

(21) Appl. No.: 16/677,094

(22) Filed: Nov. 7, 2019

(65) Prior Publication Data

US 2020/0153297 A1    May 14, 2020

(30) Foreign Application Priority Data

Nov. 9, 2018 (DE) ..................... 10 2018 128 146.3

(51) Int. Cl.
*H02K 1/27* (2022.01)
*B60K 1/00* (2006.01)
*H02K 1/276* (2022.01)

(52) U.S. Cl.
CPC ............. *H02K 1/2766* (2013.01); *B60K 1/00* (2013.01); *H02K 2213/03* (2013.01)

(58) Field of Classification Search
CPC .... B60K 1/00; H02K 1/2766; H02K 2213/03; H02K 21/14
USPC ..................................................... 310/156.56
See application file for complete search history.

(56) References Cited

U.S. PATENT DOCUMENTS

| 6,225,724 | B1 | 5/2001 | Toide et al. | |
| 2012/0274168 | A1* | 11/2012 | Holzner | H02K 1/246 |
| | | | | 310/156.53 |
| 2013/0147302 | A1* | 6/2013 | Rahman | H02K 1/2766 |
| | | | | 310/156.32 |
| 2013/0320796 | A1* | 12/2013 | Vyas | H02K 1/2766 |
| | | | | 310/156.43 |

(Continued)

FOREIGN PATENT DOCUMENTS

| DE | 19941107 B4 | 4/2000 |
| DE | 102015219689 A1 | 4/2017 |

*Primary Examiner* — Alex W Mok
(74) *Attorney, Agent, or Firm* — Hoffmann & Baron, LLP

(57) ABSTRACT

The invention relates to a rotor for a synchronous drive motor of an electrically driven motor vehicle having several rotor poles, wherein each rotor pole has at least three magnetic layers arranged radially one after the other with cavities, wherein an outermost magnetic layer includes at least one cavity filled with permanent magnetic material and each further magnetic layer includes at least two cavities filled with permanent magnetic material, furthermore each magnetic layer has an extension of a section of an ellipse, furthermore the central points of all ellipses lie within the smallest ellipse of the outer magnetic layer, wherein each cavity belonging to one of the at least three magnetic layers defines an interface in a radial plane, and each of these interfaces of a magnetic layer of the corresponding ellipse is divided into two partial interfaces, wherein bars made of the rotor material are formed in the second and every other magnetic layer between the cavities, and these bars, at the narrowest point, are at least twice as wide as the respective outer bars of the same magnetic layer.

9 Claims, 3 Drawing Sheets

(56) References Cited

U.S. PATENT DOCUMENTS

| | | | | |
|---|---|---|---|---|
| 2013/0320797 A1* | 12/2013 | Vyas | .................... | H02K 1/2766 |
| | | | | 310/156.43 |
| 2016/0380492 A1* | 12/2016 | Kawasaki | .............. | H02K 1/146 |
| | | | | 310/156.11 |
| 2018/0138764 A1* | 5/2018 | Soler | ....................... | H02K 1/276 |
| 2018/0138765 A1* | 5/2018 | Filipeti | .................. | H02K 1/246 |

* cited by examiner

ROTOR FOR A SYNCHRONOUS DRIVE MOTOR

CROSS-REFERENCE TO RELATED APPLICATIONS

The present application claims priority to German Patent Application No. 10 2018 128 146.3, filed on 9 Nov. 2018, the entire contents of which are incorporated herein by reference.

BACKGROUND

Field

The invention relates to a rotor for a synchronous drive motor of an electrically driven motor vehicle having several rotor poles, wherein each rotor pole has at least three U-shaped magnetic layers arranged sequentially, and each magnetic layer includes a row of at least three cavities, of which at least the inner cavities are filled with permanent magnetic material and furthermore the two outer cavities terminate at a rotor gap formed toward a stator, each with an outer bar. The invention further relates to a thusly equipped synchronous drive motor, as well as a motor vehicle equipped with such a drive motor.

Related Art

Synchronous drive motors are frequently used as a driving engine for electric vehicles, because they have a high torque and thus a high power density over the entire speed range and ensure high driving dynamics of the driven vehicle with low weight. In particular, such motors have high Esson's utilization factors such that a high benefit-to-cost ratio is achieved.

With hybrid synchronous motors (HSMs), the torque is composed of two components, namely the reluctance moment and the synchronous moment, wherein it is desirable to increase the portion of the reluctance moment on the overall torque as much as possible, ideally 50% or more.

The rotors of synchronous drive motors have several poles, wherein buried magnetic layers are assigned to each pole, the magnetic layers being arranged symmetrically around the pole central axes (namely the d-axis) substantially in a U shape and including a row of cavities, in which permanent magnets are arranged. The radially outermost cavities usually remain empty and thus function as flux bathers, which route the magnetic flux from the rotor and into the stator radially on the respective pole to the extent possible and minimize flux leakage. Thus, the magnetic flux density fluctuations can be reduced in the center of the air gap between the rotor and stator. Leakage losses, which reduce the efficiency, result primarily along the radially outer edge of the rotor via the bars between the outer circumference and the respective radially outermost cavity. Thus, it would be desirable to design these outer bars to be as narrow as possible. However, due to the high centrifugal forces acting on the magnets in the cavities, a deformation of the rotor would occur if the outer bars were too narrow, which would then necessitate wider bars.

SUMMARY

The object of the invention is to maximize both the synchronous and the reluctance moment with a generic rotor for a synchronous drive motor and, in doing so, to minimize the flux harmonic and the flux leakage.

The invention results from the features of the main claims. Advantageous further embodiments and designs are the subject matter of the dependent claims. Further features, application options, and advantages of the invention result from the following description and explanation of example embodiments of the invention, which are represented in the figures.

This object is particularly achieved in that
- the outermost magnetic layer includes at least one cavity filled with permanent magnetic material and each further magnetic layer includes at least two cavities filled with permanent magnetic material,
- each magnetic layer has an extension of a section of an ellipse, having a long and/or main axis and a short and/or minor axis in each case, which substantially coincides with a radial polar axis (d-axis),
- wherein the central points of all ellipses lie within the smallest ellipse of the outer magnetic layer,
- wherein the following applies to the ratio between the two axes of all magnetic layers: $1.2 < X_i < 4$, where $X_i = a_i/b_i$,
- wherein the ratio between the highest X value and the lowest X value is no more than 1.5,
- wherein each cavity belonging to one of the magnetic layers defines an interface in a radial plane, and each of these interfaces of a magnetic layer of the corresponding ellipse is divided into two partial interfaces, wherein the surface ratio of the respective partial interfaces to an interface is between 1/3 and 3, and
- wherein bars made of the rotor material are formed in the second and every other magnetic layer between the cavities, and these bars, at the narrowest point, are at least twice as wide as the respective outer bars of the same magnetic layer.

The increase in the number of cavities for each further magnetic layer is important, because the magnets arranged therein must also supply the force for the respective upper magnetic layers. The magnetic surface is thereby larger, whereby more eddy-current losses are generated. Due to the division into more and thus smaller cavities/magnets, the losses are reduced and thus the efficiency is improved.

The ellipse-like design of a pole elongated in the circumferential direction (ratio between the two axes of all magnetic layers is between 1.2 and 4) is especially advantageous, because the weight of same is less than with a low pole. Thus, an increased rotational speed stability results, wherein the bars between adjacent cavities may be kept small. The aforementioned ratio is preferably between 1.5 and 3.

The ellipses, each having a main axis and a minor axis, substantially coincide with a radial polar axis, i.e., the angle between the polar axis and the minor axis is less than 10°. In this case, the ellipses should have similar length ratios, i.e., the ratio between the largest X value and the smallest X value should be no greater than 1.5, preferably no greater than 1.2 The thicknesses of the q-flow paths are also thereby equal, which contributes to a decrease in saturation, whereby the efficiency of the motor and a converter coupled thereto are improved. The central points of all ellipses must be within the smallest ellipse of the outer magnetic layer, that is, they should be arranged somewhat concentrically, because the consistency of the flux barriers has a positive influence on the torque ripple.

It is especially advantageous when the cavities adhere to the ellipses uniformly with and without magnets, whereby consistencies of the flux bathers and of the flow paths also result.

For the magnetic field, the shortest and simplest path is also the path according to which the magnetic flux conforms. If the magnetic flux is offered a simple option (e.g., through ferromagnetic material such as iron instead of air) such as excessively large outer bridges and/or bars on the circumference of the rotor, the magnetic flux will use this shortcut as flux leakage, without generating a torque. With the narrow outer bridges, the magnetic flux is thus forced to propagate in the intended q-flow paths.

According to an advantageous refinement of the invention, the rotor includes laminated sheets, and the outer bars, at the narrowest point, are no more than twice as wide as the thickness of the laminated sheets. It is especially magnetically advantageous when the outer bars are formed to be as narrow as possible. From a production standpoint, it is usually not possible to punch bars that are narrower than the sheet thickness. The flux bathers should be closed off against the air gap to support the acoustics and impede mechanical vibrations. An especially good ratio is thus no more than twice the sheet thickness, preferably 1 to 2 times the sheet thickness. The sheet thickness is typically in a range of from 0.2 mm to 0.5 mm.

According to an advantageous refinement of the invention, the length of the outer bars is at least four times as long as the thickness of the laminated sheets. Long, narrow outer bars increase the so-called salience, i.e., the reluctance-inductance ratio Lq/Ld. In particular, the outer bars are responsible for a strong reduction in salience. In contrast, the salience loss is less with inner bars that are of the same size.

According to an advantageous refinement of the invention, the bars extend to the corresponding ellipse at an angle of from 70° to 110°. From a mechanical standpoint, the bars should be aligned along the direction of force, because it is especially advantageous when the bars are arranged at a right angle to the ellipse tangent.

According to an advantageous refinement of the invention, the permanent magnets are square-shaped, and the longitudinal axes thereof are parallel to the corresponding ellipse at at least one point within the extension thereof. Square-shaped magnets are much easier and economical to produce than curved magnets. In particular, the grinding of the magnets within precise tolerances is simpler than with a more complex shape. For one thing, an alignment of the magnets along the ellipses is especially advantageous, because this results in consistent flow paths and flux barriers. The typical magnet polarization along the surface normal (i.e., pointing in the respective direction of the uppermost magnet) of the magnets is especially advantageous when the magnets are arranged along the ellipses.

According to an advantageous refinement of the invention, permanent magnet parts adapted to the shape of the respective cavity are used at least in a part of the cavities filled with the permanent magnetic material. With this refinement, preferably all cavities, except for the two radially outermost cavities, are populated with permanent magnets. The edge cavities are preferably empty in order to serve as flux barriers, to force the magnetic flux in the radial direction, and to prevent leakage to the extent possible. In any case, the edge cavities should not be populated with permanent magnets because this would result in an excessive load of the outer bars due to centrifugal forces such that the outer bars would have to be wider which, in turn, would thereby cause leakage currents.

According to an alternative advantageous refinement of the invention, at least a part of the cavities filled with permanent magnetic material are filled with an injected, permanent magnetic material containing solidified and/or cured compound, at least in one part of the cavities filled with permanent magnetic material. With this refinement, the compound would be sprayed into the cavities with high pressure in an injection process (e.g., via an injection-molding process), where the compound would then solidify and/or set, particularly with the use of a synthetic resin. With this design, all cavities, that is, including the outer cavities, could be filled with magnetic material according to an advantageous refinement, because the density of the magnetic material and thus the centrifugal forces are less in the filled, outer cavities than they would be if magnetic parts were placed there.

The invention includes a synchronous drive motor with a rotor according to one of the aforementioned designs.

In addition, the invention includes a motor vehicle with such a synchronous drive motor.

Other advantages, features, and details result from the following description, in which at least one example embodiment is described in detail—optionally with reference to the drawing(s). Equivalent, similar, and/or functionally equivalent parts have been given the same reference numerals.

DETAILED DESCRIPTION

Figure 1:
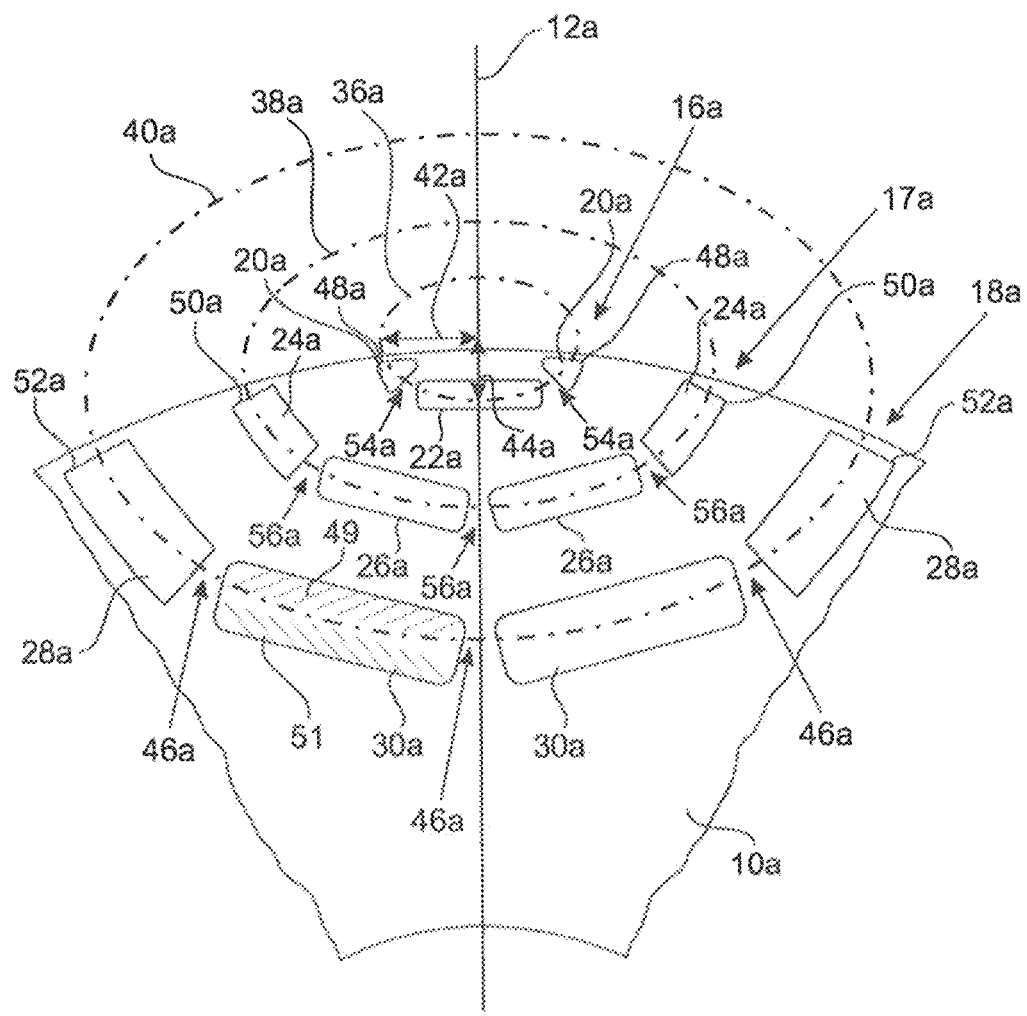
FIG. 1 shows a partial section of a first embodiment of a rotor for a synchronous drive motor.
Figure 2:
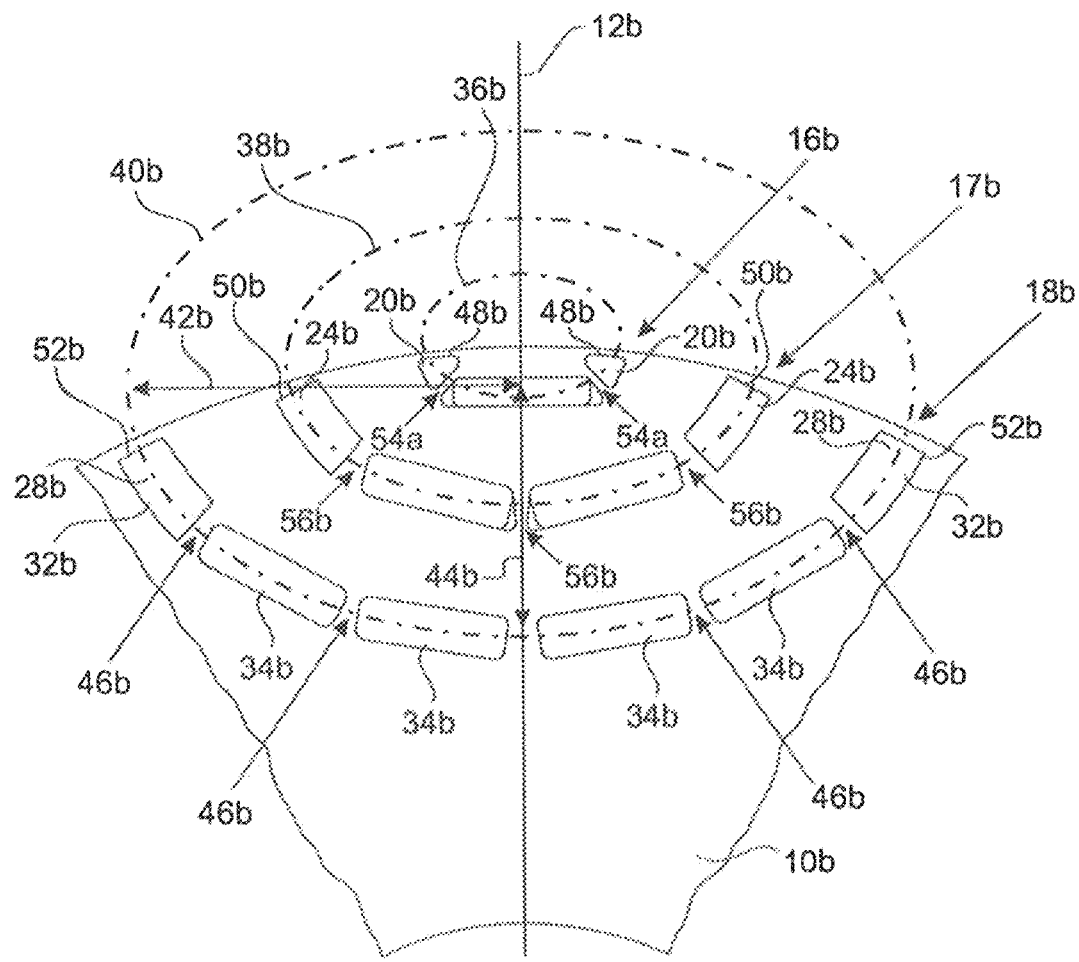
FIG. 2 shows a partial section of a second embodiment of a rotor for a synchronous drive motor.

The two figures, FIGS. 1 and 2, show two embodiments of rotors 10a, 10b in the environment of a polar axis 12a, 12b. Normally, one rotor 10a, 10b has 6 to 10 poles, which are evenly distributed about the circumference. Radially outside of the rotor 10a, 10b, the rotor is surrounded by a stator 14, as sectionally shown in FIG. 3.

Each pole of a rotor 10a, 10b has three magnetic layers 16a, 16b, 17a, 17b, 18a, 18b, each including a row of cavities. Thus, in FIG. 1, the radially outermost magnetic layer 16a includes the three cavities 20a, 22a, 20a; the middle magnetic layer 17a includes the four cavities 24a, 26a, 26a, 26a, 24a; and the innermost magnetic layer 18a includes the four cavities 28a, 30a, 30a, 28a.

It is similar in FIG. 2 with the only difference that the innermost magnetic layer 18b includes six instead of four cavities, namely 32b, 34b, 34b, 34b, 34b, 32b. However, other numbers of cavities may be provided, e.g., five in the third magnetic layer 18b.

The three cavities 20a, 22a, 20a of the outermost magnetic layer 16a of the embodiment from FIG. 1 are in a section or sub-region of an ellipse 36a, the four cavities 24a, 26a, 26a, 24a of the middle magnetic layer 17a are in a section of a larger ellipse 38a, and the four cavities 28a, 30a, 30a, 28a of the innermost magnetic layer 18a are in a section of an even larger ellipse 40a. The central points of all ellipses 36a, 38a, 40a are within the smallest ellipse. In this case, central point of an ellipse means the center between the two focal points of the ellipse. The situation is similar in the embodiment according to FIG. 2.

The respective main axes 42a, 42b and minor axes 44a, 44b are shown for the smallest ellipse 36a in FIG. 1 and for the largest ellipse 40b in FIG. 2.

The respective ratios between the main axes 42a, 42b and minor axes 44a, 44b, namely Xa=main axis 42a/minor axis 44a and where Xb=main axis 42b/minor axis 44b, is between 1.2 and 4 for all ellipses 36-40. For ellipse 36a shown in FIG. 1, Xa is about 1.6; for ellipse 40b shown in FIG. 2, Xb is about 1.9.

In one embodiment of the invention, cavities 20a, 24a, 28a and 20b, 24b, 28b, respectively, are empty air chambers and function as flux barriers for the magnetic field lines. In contrast, permanent magnets are used in cavities 22a, 26a, 30a and 22b, 26b, 30b, respectively, lying in between. Preferably, these permanent magnets are square-shaped, which facilitates the production and fit. Cavities 22a, 26a, 30a and 22b, 26b, 30b, respectively, have extensions at the respective longitudinal ends in order to form bars 46a, 46b with a defined cross-section between the cavities.

In another embodiment, all cavities are filled with magnetic material, which is injected as a plastic compound (e.g., in an injection-molding process) and then solidifies and/or sets in the cavities.

Cavity 30a on the left in FIG. 1 shows that each cavity defines an interface (also 30a) in a radial plane, and each of these interfaces of a magnetic layer 18a of the corresponding ellipse 40a is divided into two partial interfaces 49, 51, wherein the surface ratio of the respective partial interfaces 49, 51 to an interface 30a (of partial interface 49 to partial interface 51) is between 0.5 and 2. In the case shown in FIG. 1, the surface ratio is approximately 1.

Outer bars 48a, 50a, 52a and 48b, 50b, 52b, respectively, extend between the outer edge of the respective rotor 10a, 10b of respective outermost cavity 20a, 24a, 28a in FIGS. 1 and 20b, 24b, and 28b in FIG. 2. Between the individual cavities, further bars 54a, 54b are located in the respective outer magnetic layer 16a, 16b; bars 56a, 56b are located in the respective middle magnetic layer 18a, 18b; and bars 46a, 46b are located in the respective innermost magnetic layer 18a.

With the middle and inner magnetic layer 17a, 18a, 17b, 18b, these bars 46a, 46b 56a, 56b, at the narrowest point, are at least twice as wide as the respective outer bars 50a, 50b, 52a, 52b of the same magnetic layer 17a, 17b, 18a, 18b.

Figure 3:
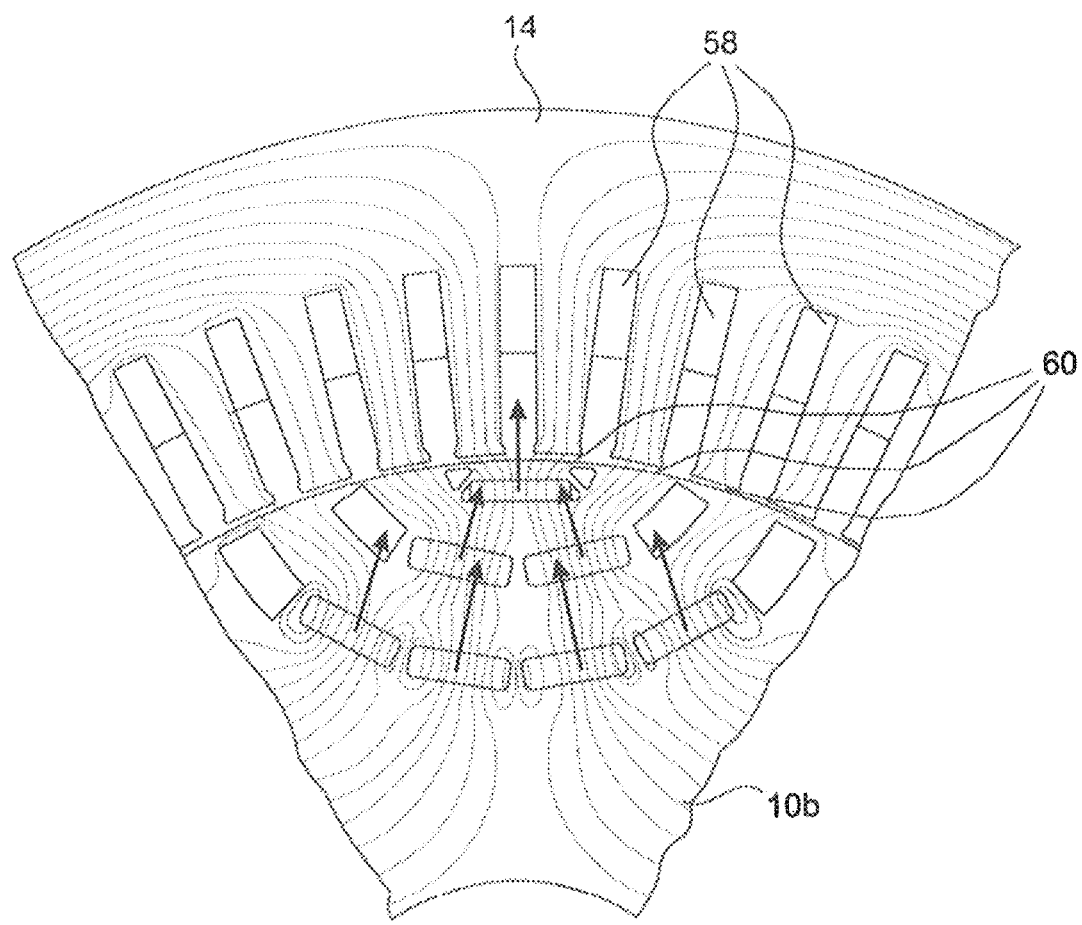
FIG. 3 shows a field line diagram through a synchronous drive motor in a polar region.

FIG. 3 shows the pole arrangement according to FIG. 2 with the rotor 10b, the stator 14, and the magnetic field lines. The stator 14 includes a series of current-conducting coils 58. Of the rotor-side cavities, the outer cavities are formed as hollow cavities, and permanent magnets are arranged in the remaining cavities. FIG. 3 shows that the magnetic field lines 60 exit from the rotor 10b largely radially bundled and can enter the stator 14.

Although the invention has been illustrated and explained in more detail using preferred example embodiments, the invention is not limited by the disclosed examples and one of ordinary skill in the art may derive other variations without extending beyond the protective scope of the invention. It is thus clear that a plurality of variation options exist. It is likewise clear that example embodiments actually only represent examples, which are not to be interpreted in any manner as a limitation, for example, of the protective scope, the use options, or the configuration of the invention. Rather, the previous description and the description of figures should make one of ordinary skill in the art capable of specifically implementing the example embodiments, wherein one of ordinary skill in the art with knowledge of the disclosed concept of the invention can undertake various changes, for example with respect to the function or the arrangement of individual elements listed in an example embodiment, without going beyond the scope of protection, which is defined by the claims and the legal equivalents thereof such as, for example, more extensive explanations in the description.

LIST OF REFERENCE NUMERALS

10a, 10b Rotors
12a, 12b Polar axis
14 Stator
16a, 16b Magnetic layer
17a, 17b Magnetic layer
18a, 18b Magnetic layer
20a, 20b Cavity
22a, 22b Cavity
24a, 24b Cavity
26a, 26b Cavity
28a, 28b Cavity
30a, 30b Cavity
32a, 32b Cavity
34a, 34b Cavity
36a, 36b Ellipse
38a, 38b Ellipse
40a, 40b Ellipse
42a, 42b Main axis
44a, 44b Minor axis
46a, 46b Bar
48a, 48b Outer bar
49 Partial interface
50a, 50b Outer bar
51 Partial interface
52a, 52b Outer bar
54a, 54b Bar
56a, 56b Bar
58 Coils
60 Magnetic field lines

The invention claimed is:

1. A rotor for a synchronous drive motor of an electrically driven motor vehicle having several rotor poles, wherein each rotor pole has at least three magnetic layers arranged sequentially, and each magnetic layer comprises a row of at least three cavities, of which at least inner cavities are filled with permanent magnetic material and two outer cavities terminate at a rotor gap formed toward a stator, each with an outer bar, wherein:

an outermost magnetic layer comprises at least one cavity filled with permanent magnetic material and each further magnetic layer comprises at least two cavities filled with permanent magnetic material;

each magnetic layer has an extension of a section of an ellipse, each having a long axis and a short axis, wherein the short axis substantially coincides with a radial polar axis (d);

wherein central points of all ellipses lie within a smallest ellipse of the outer magnetic layer;

wherein a following applies to a length ratio between the long axis and the short axis of each magnetic layer of the at least three magnetic layers: $1.2<X<4$, where $X=a/b$, wherein X is the length ratio of each magnetic layer, a is a length of the long axis and b is a length of the short axis of each magnetic layer;

wherein a ratio between a highest X value and a lowest X value is no more than 1.5;

wherein each cavity belonging to one of the at least three magnetic layers defines an interface in a radial plane, and each interface of a magnetic layer of a corresponding ellipse is divided into two partial interfaces, wherein a surface ratio of each of the two partial interfaces to a respective interface of the magnetic layer in the radial plane is between 1/3 and 3; and wherein bars made of a rotor material are formed in a second and every other magnetic layer between the cavities, and the bars, at their narrowest point, are at least twice as wide as respective outer bars of a same magnetic layer.

2. The rotor according to claim 1, wherein the rotor includes laminated sheets, and the outer bars, at the narrowest point, are no more than twice as wide as a thickness of the laminated sheets.

3. The rotor according to claim 2, wherein a length of the outer bars is at least four times as long as the thickness of the laminated sheets.

4. The rotor according to claim 1, wherein the bars extend at an angle of 70°-110° to a corresponding ellipse.

5. The rotor according to claim 1, wherein the permanent magnetic material are square-shaped magnets, wherein the magnets define a substantially rectangular interface in a radial plane, and longitudinal axis of the rectangular interface lies at at least one point within the extension thereof, parallel to the corresponding ellipse.

6. The rotor according to claim 1, wherein permanent magnet parts adapted to shapes of respective cavities are used at least in a part of the cavities filled with the permanent magnetic material.

7. The rotor according to claim 1, wherein at least a part of the cavities filled with permanent magnetic material are filled with an injected, permanent magnetic material containing a solidified and/or a cured compound.

8. A synchronous drive motor of a motor vehicle, the drive motor comprising:
a stator; and
a rotor having several rotor poles, wherein each rotor pole has at least three magnetic layers arranged sequentially, and each magnetic layer comprises a row of at least three cavities, of which at least inner cavities are filled with permanent magnetic material and two outer cavities terminate at a rotor gap formed toward the stator, each with an outer bar, wherein:
an outermost magnetic layer comprises at least one cavity filled with permanent magnetic material and each further magnetic layer comprises at least two cavities filled with permanent magnetic material;
each magnetic layer has an extension of a section of an ellipse, each having a long axis and a short axis, wherein the short axis substantially coincides with a radial polar axis (d);
wherein central points of all ellipses lie within a smallest ellipse of the outer magnetic layer;
wherein a following applies to a length ratio between the long axis and the short axis of each magnetic layer of the at least three magnetic layers: $1.2<X<4$, where $X=a/b$, wherein X is the length ratio of each magnetic layer, a is a length of the long axis and b is a length of the short axis of each magnetic layer;
wherein a ratio between a highest X value and a lowest X value is no more than 1.5;
wherein each cavity belonging to one of the at least three magnetic layers defines an interface in a radial plane, and each interface of a magnetic layer of a corresponding ellipse is divided into two partial interfaces, wherein a surface ratio of each of the two partial interfaces to a respective interface of the magnetic layer in the radial plane is between 1/3 and 3; and
wherein bars made of a rotor material are formed in a second and every other magnetic layer between the cavities, and the bars, at their narrowest point, are at least twice as wide as respective outer bars of a same magnetic layer.

9. A motor vehicle comprising a synchronous drive motor, the drive motor comprising:
a stator; and
a rotor having several rotor poles, wherein each rotor pole has at least three magnetic layers arranged sequentially, and each magnetic layer comprises a row of at least three cavities, of which at least inner cavities are filled with permanent magnetic material and two outer cavities terminate at a rotor gap formed toward the stator, each with an outer bar, wherein:
an outermost magnetic layer comprises at least one cavity filled with permanent magnetic material and each further magnetic layer comprises at least two cavities filled with permanent magnetic material;
each magnetic layer has an extension of a section of an ellipse, each having a long axis and a short axis, wherein the short axis substantially coincides with a radial polar axis (d);
wherein central points of all ellipses lie within a smallest ellipse of the outer magnetic layer;
wherein a following applies to a length ratio between the long axis and the short axis of each magnetic layer of the at least three magnetic layers: $1.2<X<4$, where $X=a/b$, wherein X is the length ratio of each magnetic layer, a is a length of the long axis and b is a length of the short axis of each magnetic layer;
wherein a ratio between a highest X value and a lowest X value is no more than 1.5;
wherein each cavity belonging to one of the at least three magnetic layers defines an interface in a radial plane, and each interface of a magnetic layer of a corresponding ellipse is divided into two partial interfaces, wherein a surface ratio of each of the two partial interfaces to a respective interface of the magnetic layer in the radial plane is between 1/3 and 3, and
wherein bars made of a rotor material are formed in a second and every other magnetic layer between the cavities, and the bars, at their narrowest point, are at least twice as wide as respective outer bars of a same magnetic layer.

* * * * *